US006966228B2

(12) United States Patent
Binet et al.

(10) Patent No.: US 6,966,228 B2
(45) Date of Patent: Nov. 22, 2005

(54) RESONATOR-TYPE MICROELECTRONIC PRESSURE SENSOR THAT WITHSTANDS HIGH PRESSURES

(75) Inventors: Florence Binet, Sugar Land, TX (US); Eric Donzier, Brookfield, CT (US); Sandrine Lelong-Feneyrou, Igny (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/476,262

(22) PCT Filed: Apr. 25, 2002

(86) PCT No.: PCT/EP02/06942

§ 371 (c)(1),
(2), (4) Date: Oct. 29, 2003

(87) PCT Pub. No.: WO03/001171

PCT Pub. Date: Jan. 3, 2003

(65) Prior Publication Data
US 2004/0129086 A1 Jul. 8, 2004

(30) Foreign Application Priority Data
May 10, 2001 (FR) .................................. 01 06170

(51) Int. Cl.[7] ............................................. G01L 9/00
(52) U.S. Cl. ......................................................... 73/754
(58) Field of Search .......................... 73/754, 708, 706, 73/702

(56) References Cited

U.S. PATENT DOCUMENTS

| 4,229,979 | A | | 10/1980 | Greenwood |
| 4,541,003 | A | * | 9/1985 | Otsuka et al. ............... 257/660 |
| 4,614,119 | A | * | 9/1986 | Zavracky et al. ............. 73/704 |
| 4,764,244 | A | * | 8/1988 | Chitty et al. .................. 216/20 |
| 4,884,450 | A | * | 12/1989 | Greenwood et al. .......... 73/702 |
| 5,013,693 | A | * | 5/1991 | Guckel et al. ................. 216/2 |
| 5,090,254 | A | * | 2/1992 | Guckel et al. ........... 73/862.59 |
| 5,188,983 | A | * | 2/1993 | Guckel et al. ................. 438/53 |
| 5,226,423 | A | * | 7/1993 | Tenerz et al. ................ 600/486 |
| 6,182,513 | B1 | * | 2/2001 | Stemme et al. ............... 73/704 |
| 6,546,804 | B2 | * | 4/2003 | Stemme et al. ............... 73/704 |
| 2005/0023629 | A1 | * | 2/2005 | Ding et al. .................. 257/414 |

FOREIGN PATENT DOCUMENTS

JP        61114139        5/1986

* cited by examiner

*Primary Examiner*—Edward Lefkowitz
*Assistant Examiner*—Andre Allen
(74) *Attorney, Agent, or Firm*—Victor H. Segura; Brigitte L. Echols (57) ABSTRACT

A microelectronic pressure sensor comprises a resonator (23) made on the basis of a crystalline material and secured to the inside of a package (24) made use of a cap (27) and a baseplate (26) for assembling one to the other. The cap (27) and the baseplate (26) are made completely or almost completely out of the same material as the resonator (23), and the pressure (Pe) to be detected is applied all around the package.

18 Claims, 10 Drawing Sheets

COUPE A-A

RESONATOR-TYPE MICROELECTRONIC PRESSURE SENSOR THAT WITHSTANDS HIGH PRESSURES

TECHNICAL FIELD

The present invention relates to microelectronic pressure sensors that withstand high pressures, e.g. greater than $10^8$ pascals (Pa), and that include a resonator. This type of sensor can be used for measuring pressures in fluids, e.g. for applications in the oil industry or in ocean depths. This type of sensor is said to be "microelectronic" since it makes use of microelectronic manufacturing techniques, thus enabling sensors to be manufactured collectively.

STATE OF THE PRIOR ART

Figure 1A:
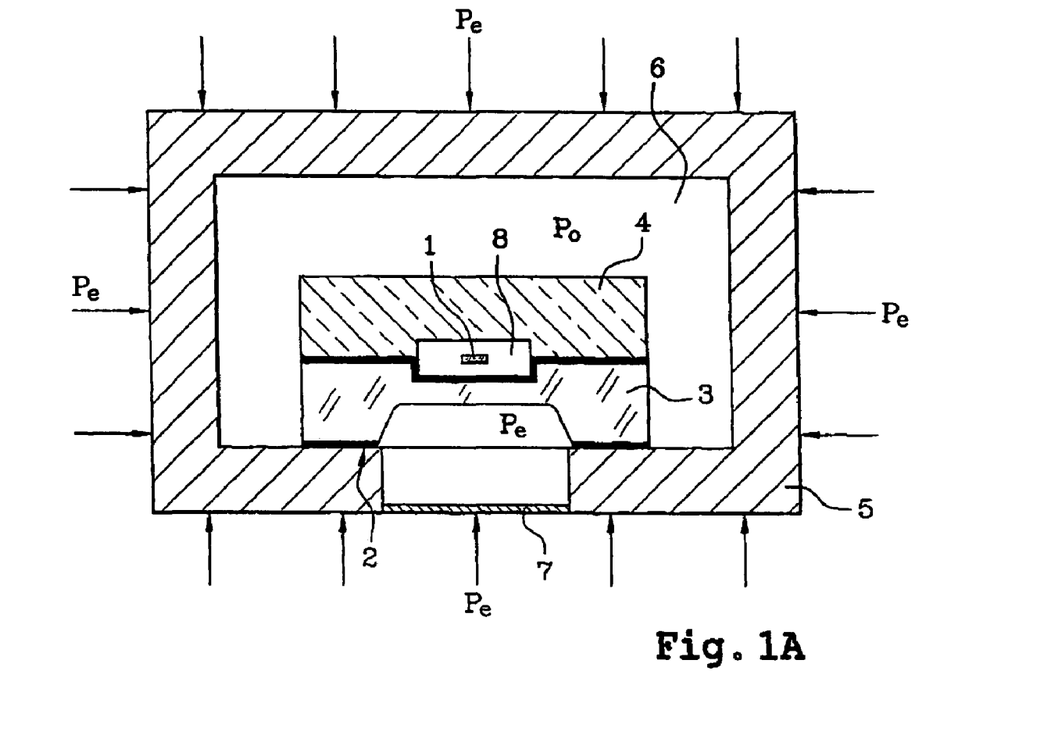
FIGS. 1A and 1B, described above, are a cross-section through a prior art microelectronic pressure sensor and a plan view of its baseplate.
Figure 1B:
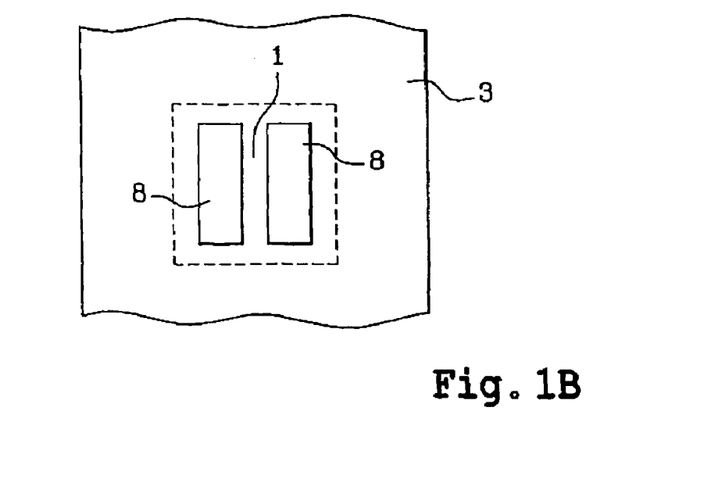

Reference is made to FIGS. 1A and 1B which show a conventional microelectronic pressure sensor having a silicon resonator. It is subjected to pressure Pe which is to be detected.

The resonant frequency of the resonator varies with the pressure applied to the sensor. It suffices to excite the resonator by applying energy thereto, e.g. acoustic, electrostatic, or optical energy, and then detecting variation in its resonant frequency, e.g. in capacitive, inductive, piezoresistive, optical, or acoustic manner, where said frequency variation represents a variation in the pressure to be detected. Neither the excitation means nor the frequency detection means are shown in order to avoid cluttering the figure, however they can be constituted by strain gauges, electrodes, optical means, magnetic means, etc., for example.

The pressure sensor comprises a resonator 1 which generally extends in a vacuum inside a package 2 comprising a cap 4 and a baseplate 3 including a diaphragm to which the resonator 1 is fixed. As a result, the baseplate 3 has a central zone that is thin. The cap 4 and the baseplate 3 are assembled together. The package 2 is placed in a protective enclosure 5, generally made of metal, which protects it from the external environment and on which the pressure to be detected Pe is applied.

In general, the diaphragm 3 is made of a crystalline material such as silicon, for example. The cap 4 is generally made of glass, ceramic, or quartz. The choice of material for the cap 4 often depends on the method used for assembling the diaphragm 3 to the cap 4.

The resonator 1 is also generally made of a crystalline material, such as silicon, for example.

The package 2 is secured to the enclosure 5 via the diaphragm 3, so that the pressure to be detected Pe applies to only one of the main faces of the diaphragm 3. A pressure Po that is different from the pressure Pe to be detected exists in the space 6 that extends between the enclosure 5 and the cap 4. The space 6 subjected to the pressure Po can be filled with a fluid, e.g. oil or air.

The enclosure 5 has a wall that is relatively thick around the space 6, whereas at the diaphragm 3 the wall is finer and is fitted with a protective element 7 that is leakproof and that can transmit pressure, such as a membrane or a bellows, for example. The pressure Pe to be detected is thus applied to the diaphragm 3.

On its face opposite from its face that receives the pressure Pe to be detected, the diaphragm 3 has a recess 8 which is in register with a recess defined by the cap 4 when the package 2 is closed. This recess 8 contributes to reducing the thickness of the diaphragm 3. The resonator is shown in FIG. 1B in the form of a bridge which spans the recess 8, having both ends secured to the diaphragm 3.

The term "recess" is used to mean a zone hollowed out in the material of the diaphragm.

This type of microelectronic pressure sensor can be obtained by a collective manufacturing method using microelectronic techniques. A plurality of diaphragms can be manufactured on a single wafer of silicon. The resonators are made and secured to the diaphragms likewise in collective manner, and the various sensors are separated from one another only subsequently.

This gives rise to numerous advantages: cost reduction, miniaturization; and compatibility with associated electronic circuits for processing the information supplied by the sensors. This type of pressure sensor is described in PATENT ABSTRACT OF JAPAN, vol.10, No.298 (P-505), 09.10.1986; Pub. No. JP-A-61 114 139.

The drawback of the sensor shown in FIG. 1 is that it is not suitable for detecting high pressures, e.g. pressures greater than $10^8$ Pa or $1.5 \times 10^8$ Pa because of the fragility of the diaphragm. By pressing against the thinnest zone of the diaphragm, such pressures run the risk of breaking it.

The sensitivity of a diaphragm is a function of its area and is inversely proportional to its thickness. Area and thickness are also the main parameters that define its mechanical strength, and thus the maximum pressure it can withstand. As a result, at high pressures, mechanical strength can be obtained only by increasing thickness or reducing area. In either case, sensitivity is reduced. It can thus be seen that the sensitivity of such a sensor increases with a decrease in the maximum pressure to which it is subjected.

The stresses which apply to the diaphragm 3 in the zones where it is fixed to the cap 4 and to the enclosure 5 and which are represented by bold lines in FIG. 1 can reach values that are close to or even greater than the breaking strength of the bonding in these zones, and so said zones can break. In addition, the greater the increase in mechanical stress, the more the sensor is subjected to hysteresis phenomena which reduce its stability in the long term. At high pressures, the reliability of such sensors is not good.

SUMMARY OF THE INVENTION

The present invention seeks to mitigate those drawbacks. An object of the invention is to provide a microelectronic pressure sensor that is reliable at high pressure while remaining inexpensive to manufacture.

To achieve this, the present invention provides a microelectronic pressure sensor comprising a resonator made on the basis of a crystalline material secured to the inside of a package formed by a cap and a baseplate for assembling one to the other. The cap and the baseplate are made completely or almost completely out of the same material as the resonator. The base plate is rigid such that when the pressure to be detected is applied all around the package, stresses are distributed substantially uniformly around the package.

The crystalline material is preferably monocrystalline silicon, but other materials used in microelectronics can also be used, such as gallium arsenide or polycrystalline silicon ("polysilicon").

The baseplate may comprise a frame superposed on a slab. The resonator is secured to the frame which extends between the slab and the cap when the package is closed. The cap, the frame, and the slab contribute to defining a cavity in which the resonator is suspended.

The dimensions of the cavity are small compared with the outside dimensions of the package.

The slab can be assembled to the frame, with assembly being performed by bonding using a filler of metal or of glass, or by bonding without using a filler, under an oxidizing atmosphere.

In this configuration, the frame contributes to defining the recess of the baseplate.

In another configuration, the baseplate can comprise a single piece. It has a residual sacrificial layer between the slab and the frame, which sacrificial layer contributes to defining the recess in the baseplate.

The package can be sealed by bonding using a filler of metal or of glass, or by bonding without using any filler, under an oxidizing atmosphere.

The package can be surrounded by a protective case with the pressure to be detected being applied on the outside thereof, the case being provided with means enabling the pressure to be detected to apply also inside the case.

These means can be leakproof relative to the medium outside the case, or on the contrary they can be permeable to said medium.

In order to improve measurement accurately, the resonator can serve not only to measure pressure, but also to measure temperature.

The present invention also provides a method of making a pressure sensor that withstands relatively high pressures, said sensor comprising a resonator secured to the inside of a package formed by a cap and a baseplate for assembling one to the other, the base plate being rigid such that when the pressure to be detected is applied all around the package, stresses are distributed substantially uniformly around the package, the method being characterized in that it comprises the following steps:

machining the cap in a crystalline material;

machining the baseplate and the resonator which are made completely or almost completely out of the same crystalline material, the baseplate comprising a slab and a frame superposed thereon, the frame and the resonator being formed integrally; and assembling the cap to the baseplate so that the frame lies between the slab and the cap.

The cap can be assembled to the baseplate by bonding using a filler of metal or of glass, or by bonding without using any filler, under an oxidizing atmosphere.

To make the baseplate, the method can comprise the following steps: starting from a composite wafer comprising a sacrificial layer between two layers of the same crystalline material, etching openings in one of the layers of crystalline material so as to lay bare the sacrificial layer in order to define the resonator of the frame; and eliminating the sacrificial layer beneath the resonator to release the resonator, the other layer of crystalline material serving as the slab.

After the sacrificial layer has been eliminated, a washing step may be performed and then a resin-application step so as to ensure that the resonator does not adhere to the other layer of crystalline material, and then finally a step is performed of removing the resin.

In a variant, the method can comprise the following steps for making the baseplate:

etching openings in a wafer of crystalline material in order to define the resonator of the frame;

thinning the resonator; and superposing and assembling the etched wafer on another wafer of the same crystalline material forming the slab.

Assembly can be performed by bonding using a filler or metal or glass, or by bonding without using any filler, under an oxidizing atmosphere.

The present invention also provides an apparatus for monitoring pressure in a well, the apparatus comprising an array of pressure sensors as the ones previously defined according to the invention, said array of sensors being distributed along at least a portion of the well and connected to surface equipment.

BRIEF DESCRIPTION OF THE DRAWINGS

The present invention will be better understood on reading the following description of embodiments given purely by way of non-limiting indication and with reference to the accompanying drawings.

DETAILED DESCRIPTION OF PARTICULAR EMBODIMENTS

Figure 2A:
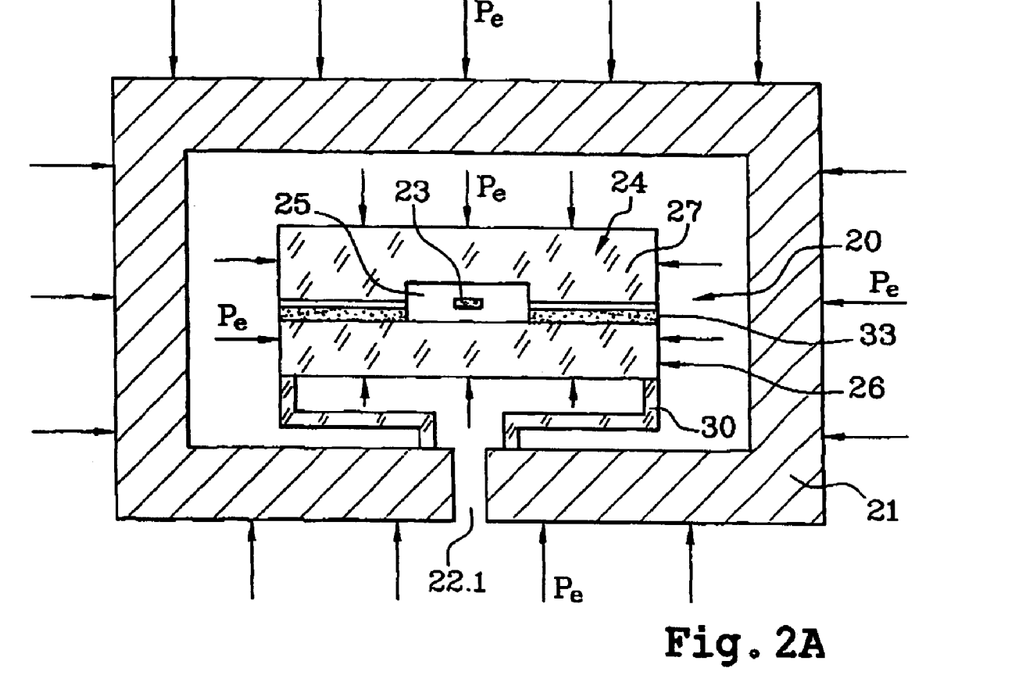
FIGS. 2A, 2B, 2C, and 2D are a cross-section through a first embodiment of a pressure sensor of the invention and plan views of different portions of its package, together with a cross-section through another embodiment of a pressure sensor of the invention.
Figure 2B:
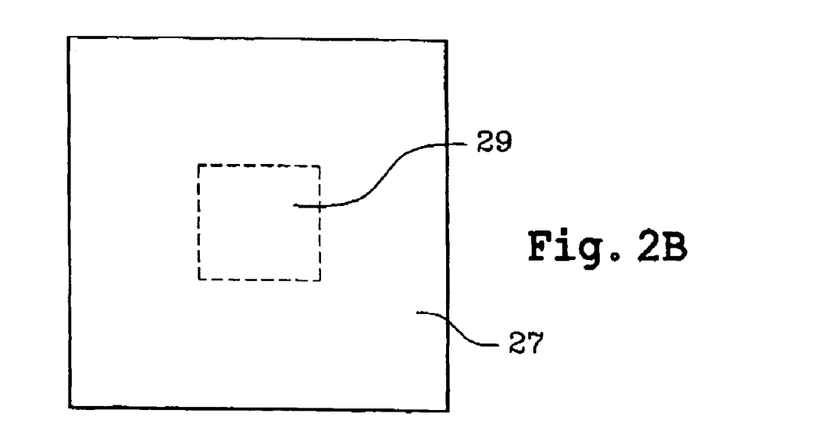
Figure 2C:
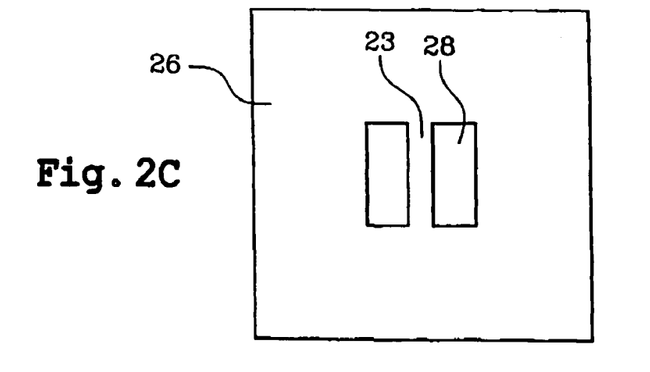

Reference is made to FIGS. 2A, 2B, and 2C. The pressure sensor of the invention is referenced 20.

As in the prior art, the sensor 20 comprises a resonator 23 made of a crystalline material, and the resonator 23 is secured to a package 24 inside which it is mounted. The package 24 comprises a baseplate 26 and a cap 27 which co-operate with each other. However, in this case the baseplate 26 and the cap 27 are made completely or almost completely out of the same material as the resonator 23, and the pressure Pe to be detected is applied around the package 24. The baseplate 26 and the cap 27, when assembled together, define between them a cavity 25 in which the resonator 23 is suspended. The package 24 is hermetically sealed and the pressure that exists inside the cavity 25 is different from the pressure to be detected, and is preferably a vacuum.

Unlike the prior art, the baseplate no longer forms a diaphragm that is to be subjected to the pressure to be detected, nor is the cap subjected to some other pressure that is independent from the pressure to be detected.

The configuration of the pressure sensor 20 of the invention is simple, thereby making it particularly robust.

The package 24 is shown as being placed inside a protective enclosure 21 which can be made of metal. This protective enclosure 21 is subjected on the outside to the pressure Pe to be detected, which pressure is applied by a medium in which the enclosure 21 is immersed. The medium can be a gas or a liquid, and more generally it is a fluid. The enclosure 21 is provided with means 22.1 and 22.2 enabling the same pressure Pe to become established both inside it and outside it. In FIG. 2A, the means 22.1 are shown as being constituted by a capillary putting the inside of the protective enclosure 21 into communication with the outside. The fluid present outside the protective enclosure 21 can penetrate to the inside.

Figure 2D:
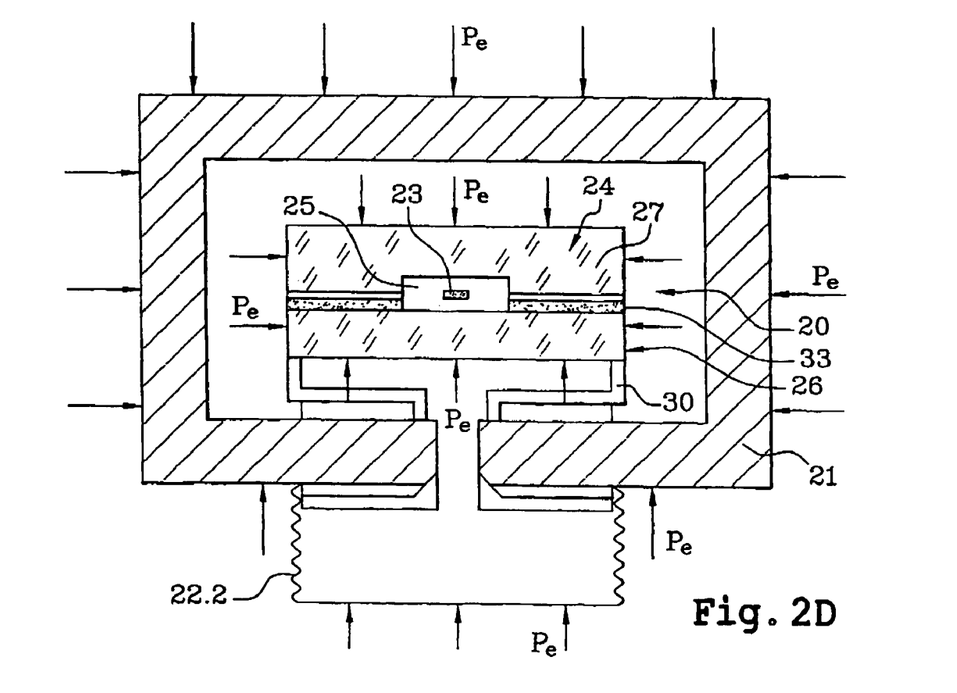

If the sensor is immersed in a fluid which is aggressive, then it is preferable to prevent the fluid from coming into contact with the package 24, i.e. to prevent it from penetrating into the inside of the protective enclosure 21. The means 22.2 enabling the same pressure to be applied on the inside are then leakproof and can be implemented in the form of a bellows, as shown in FIG. 2D. Apart from this feature, FIG. 2D is identical to FIG. 2A. Instead of using a bellows, it is possible to use a membrane comparable to the membrane referenced 7 in FIG. 1A.

The package 24 is held inside the protective enclosure 21 by means of a support 30 which allows the pressure Pe to be detected to become established uniformly around the package 24.

By being applied all around the package 24, the pressure Pe to be detected has the effect of subjecting it in substantially uniform manner to compression. In pressure sensors where the pressure is applied only to the diaphragm-forming baseplate, then the baseplate and the cap are subjected to tension and bonding zones between them are subjected to very high concentrations of tension.

It must also be remembered that the sensor may be required to operate at high temperature, e.g. in petroleum applications at temperatures of 200° C. or higher. Under such conditions, the differential stresses in the bonding zones are higher than at lower temperatures.

The dimensions of the cavity 25 receiving the resonator 23 are selected to be small compared with the outside dimensions of the package 24 so that the cavity 25 has almost negligible influence on the elastic properties of the package 24 which can then be considered as being a solid piece.

In the FIG. 2, it is assumed that the baseplate 26 is a single piece but that it includes a residual sacrificial layer 33 sandwiched between two layers of crystalline material of the same type as the material of the resonator 23 and of the cap 27, the sacrificial layer generally being an oxide of the crystalline material. The presence of this residual sacrificial layer 33 explains why the term "almost" is used. Details of this particular structure are given below.

The baseplate 26 can also be built up from a plurality of assembled-together parts, as shown in FIG. 4.

FIGS. 2B and 2C show respectively the cap 27 and the baseplate 26 as seen from above. Each of the baseplate 26 and the cap 27 includes a respective recess 28, 29 situated in a central zone. These two recesses 28 and 29 face each other when the cap is bonded to the baseplate, and together they define the cavity 25.

In this example, the resonator 23 is in the form of a bridge having both ends secured to the baseplate 26. It is suspended across the cavity 25. When the baseplate 26 is assembled to the cap 27, the resonator 23 does not come into contact therewith apart from its ends which are fixed to the baseplate 26.

Other forms of resonator 23 are possible, and some of them are shown in FIGS. 3 and 4.

The resonator 23, the baseplate 26, and the cap 27 are made almost entirely out of the same crystalline material. This material is advantageously monocrystalline silicon which has advantageous mechanical properties: good dimensional stability associated with a small coefficient of expansion; and elastic properties that are reproducible and that depend little on temperature.

Other crystalline materials could also be used, in particular the materials used in microelectronics and available in the form of wafers, such as polysilicon and gallium arsenide, for example.

When the various portions of the package are all made of monocrystalline material, the phenomenon of hysteresis appears to a small extent only.

The package 24 is sealed by assembling the cap 27 to the baseplate 26. This assembly can be performed by bonding using a filler of glass or metal, e.g. tin or gold, or by bonding performed without using any filler, e.g. under an oxidizing atmosphere. This latter assembly technique is particularly suitable for use with silicon. Bonding is produced by oxide diffusion at the interface between the two parts that are to be assembled together. It is of excellent quality and provides strength equivalent to that of silicon.

The assembly technique that does not make use of a filler is particularly advantageous since it does not give rise to its own specific mechanical stresses.

Monocrystalline silicon has a coefficient of elasticity which enables a pressure of at least $10^7$ Pa to generate measurable effects on a part that is solid or substantially solid.

A sensor of the invention possesses good stability and good reproducibility, and these qualities are associated with the mechanical properties of the crystalline material used. Monocrystalline silicon is very pure and it has a low concentration of dislocations, which is highly favorable.

In conventional pressure sensors with a diaphragm, the thickness of the diaphragm must be particularly well determined in order to achieve a desired level of reproducibility, and said thickness is of the order of 100 micrometers ($\mu$m). This no longer applies since the baseplate is now solid.

Such a sensor can withstand relatively high pressures since overall it is subjected to compression and stresses are distributed substantially uniformly around the package. It possesses acceptable sensitivity for pressures of the order of $10^8$ Pa to $10^9$ Pa, which pressures are 10 to 100 times those which can be detected using conventional sensors.

The sensitivity of such a sensor is good since by distributing stresses all around the package, the exchange area of the pressure sensor is increased so it tis possible to limit the thickness of the package.

Variants of the pressure sensor of the invention are described below, reference is made initially to FIGS. 3A to 3D.

Figure 3A:
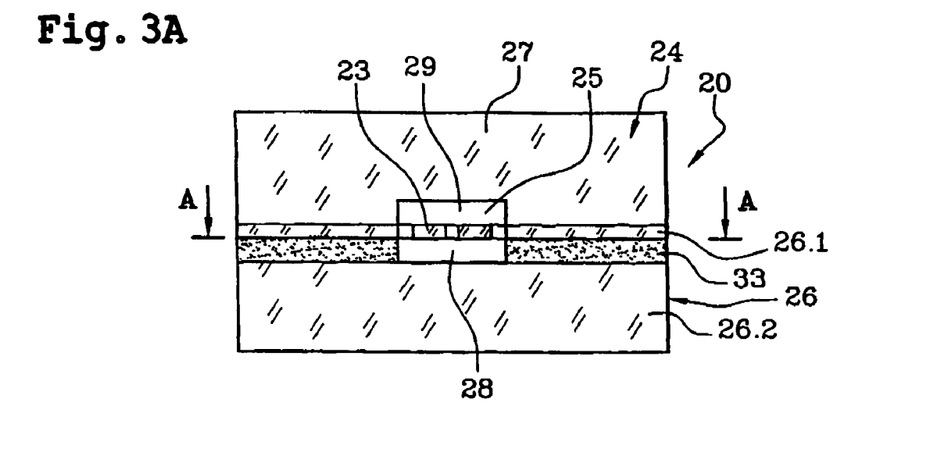
FIGS. 3A, 3B, 3C, and 3D are a cross-section through another embodiment of a pressure sensor of the invention, and plan views of the various portions of its package.
Figure 3B:
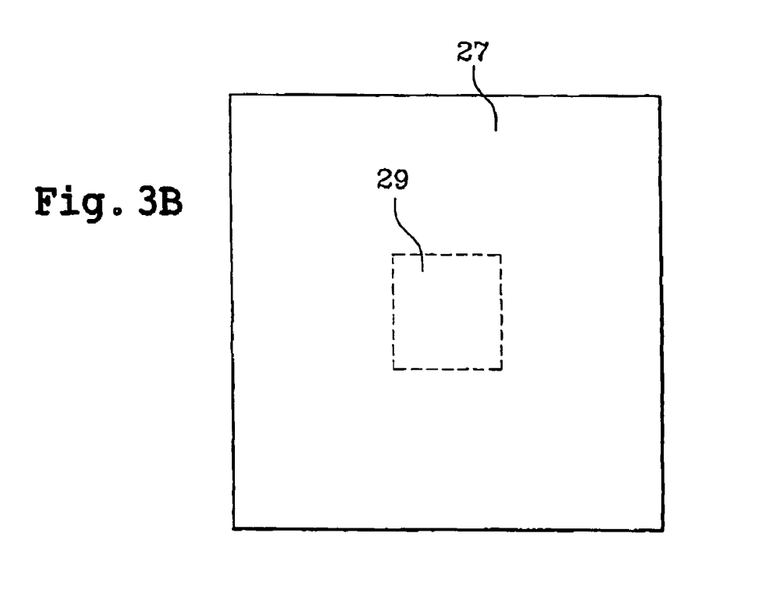

The sensor 20 is shown in cross-section in FIG. 3A. The protective enclosure is not shown. As in FIG. 2A, there can be seen the package 24 with its baseplate 26 and cap 27, each having a respective recess 28, 29, said recesses co-operating to define a cavity 25. The cap 27 is shown in FIG. 3B.

The cap 27 is made from a wafer of crystalline material in which the recess 29 is etched.

Figure 3C:
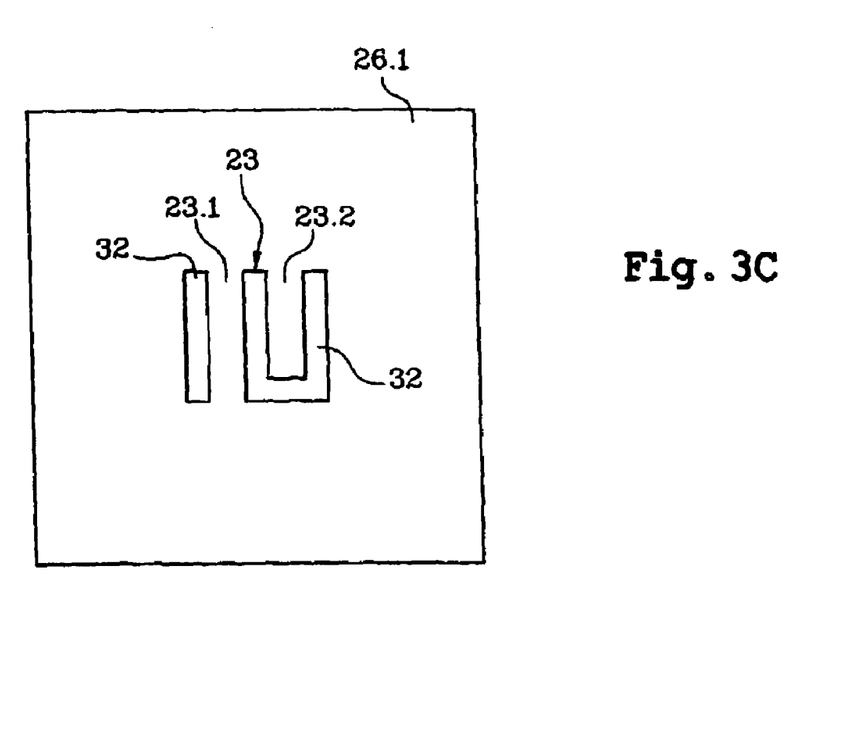
Figure 3D:
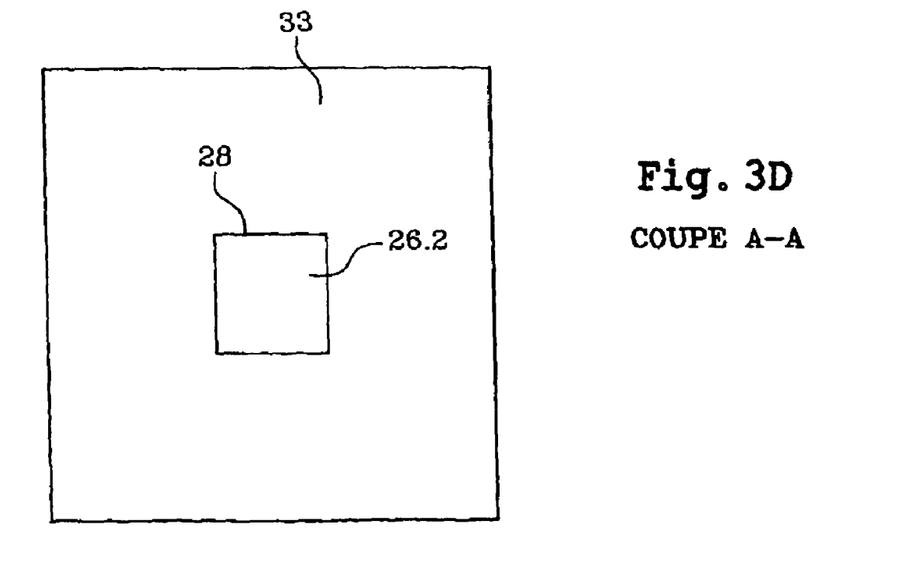

The baseplate 26 is shown in plan view in FIG. 3C and in section view on line AA in FIG. 3D. In FIG. 3C, it can be seen that it co-operates with the resonator 23.

The baseplate 26 comprises a frame 26.1 superposed on a slab 26.2 via a thin residual sacrificial layer 33 generally constituted by an oxide of the crystalline material and extending between the slab 26.2 and the frame 26.1. The resonator 23 is part of the frame 26.1. The residual sacrificial layer 33 contains the recess 28 and the slab 26.2 is solid.

Figure 5A:
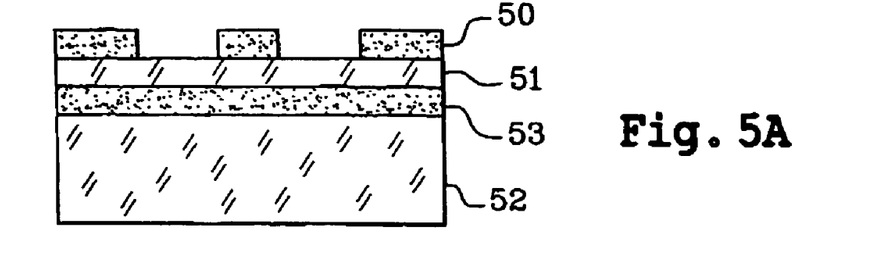
FIGS. 5A to 5H show various steps in the manufacture of a pressure sensor of the invention.

The presence of the residual sacrificial layer 33 is associated with the method of making the resonator 23, the frame 26.1, and the slab 26.2 conjointly. This method is shown in FIG. 5.

The starting material is a composite wafer made up of two layers 51, 52 of the same crystalline material sandwiching a sacrificial layer 53 made of an oxide of the crystalline material. If the crystalline material is silicon, then the wafer is known as "silicon on insulator" (SOI). Such a wafer thus comprises a silicon substrate 52 coated in a thin film of silicon oxide 53 having a top film Si of silicon lying thereon. The substrate 52 is to serve as the slab 26.2, the thin film of oxide 52 as the sacrificial layer 53, and the top film of silicon 52 as the frame 26.1 and the resonator 23.

Figure 5B:
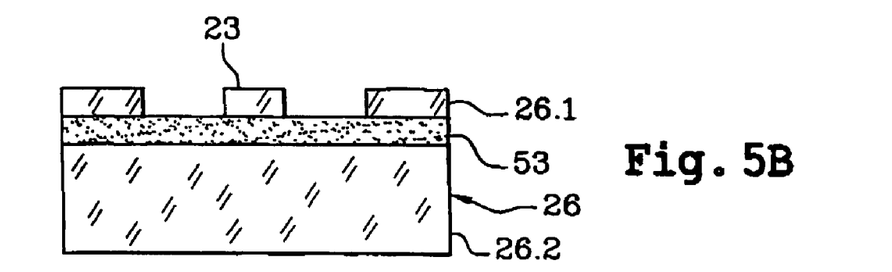

Initially, photosensitive resin 50 is deposited on the top film 51, the resin is exposed, and it is then developed so as to transfer the pattern of the resonator 23 that is to be etched (FIG. 5A) lithographically thereto. Thereafter the outline of the resonator 23 is etched in the top film 51 with the resin 50 acting as a mask. This operation can be performed using a plasma. In FIG. 5B, etching has been performed and the resin 50 has been removed.

The portion of the top film 51 surrounding the resonator 23 forms the frame 26.1. Openings 32 have thus been made in the top film 51 to define the resonator 23.

Figure 5C:
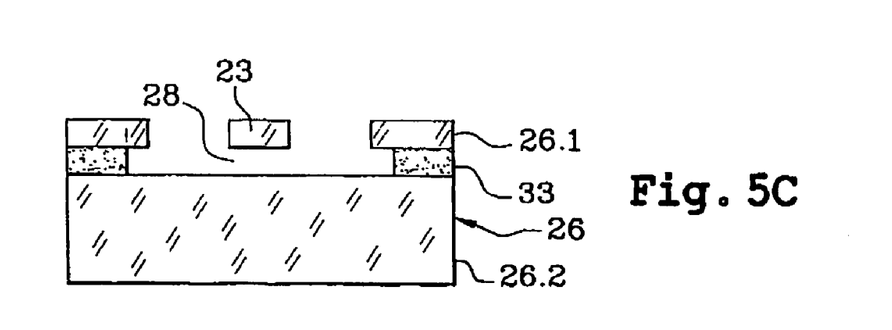

It is then necessary to make the recess 28 of the baseplate 26 in the oxide layer 53 so as to release the resonator 23, leaving it suspended in the cavity. The sacrificial layer 33 nevertheless remains around the recess 28, being sandwiched between the frame 26.1 and the slab 26.2 (FIG. 5C).

The oxide can be removed to release the resonator 23 by chemical etching using an acid, e.g. non-dilute hydrofluoric acid HF. Etching is performed isotropically. The acid dissolves only the oxide and does not affect the crystalline material, i.e. the substrate 52 forming the slab 26.2.

The resonator 23 could be released by hydrophilic treatment, e.g. rinsing in isopropyl alcohol, or by sublimination.

Figure 5D:
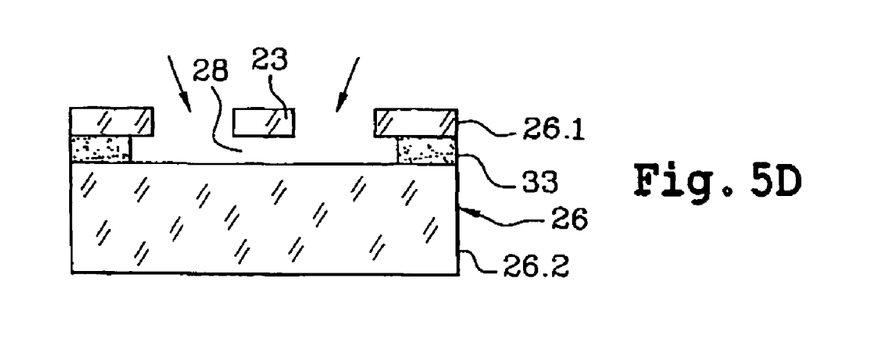

Thereafter, it is necessary to rinse and wash the baseplate 26 and the resonator 23 as obtained in this way (FIG. 5D). Rinsing can be performed using deionized water, optionally having an acid solvent added thereto.

However, the thickness of the resonator 23 is very small and if it is not stiff enough to counterbalance the attractive forces associated with surface tension, then there is a danger of the rinsing liquid pulling it down onto the slab 26.2 by capillarity as the liquid is removed. If they become stuck together, the slab and resonator assembly becomes unusable.

Figure 5E:
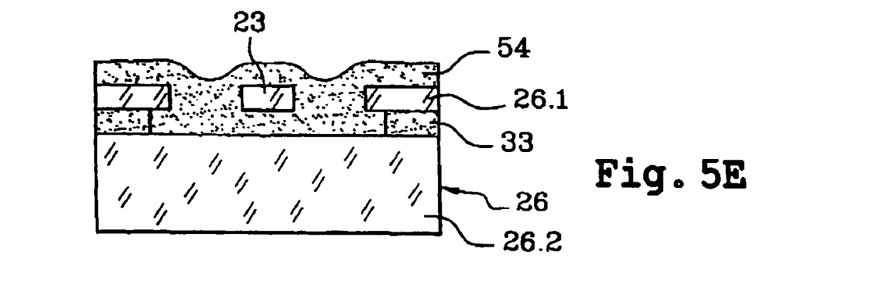
Figure 5F:
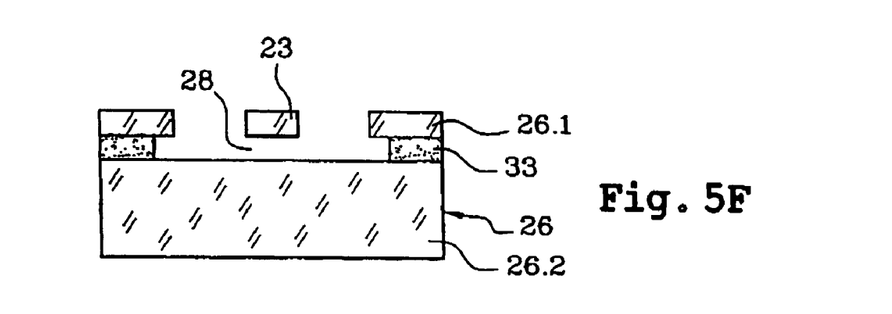

To avoid that drawback, it is possible to perform a resin application step after rinsing. This step is performed by progressively replacing the rinsing liquid by means of resin 54 while maintaining the liquid phase. As it solidifies, the resin 54 coats the resonator 23 and occupies all of the space made empty by dissolving the oxide (FIG. 5E). The resin 54 can then be removed by plasma (FIG. 5F). The solution for chemical etching the oxide is selected to be compatible with applying resin.

Figure 5G:
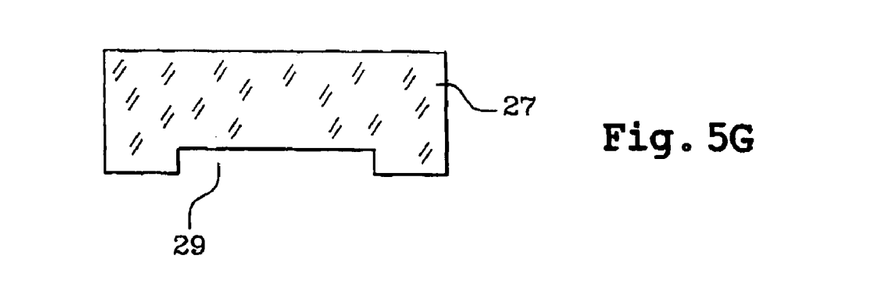

Once the baseplate 26 and the associated resonator 23 have been made, they can be assembled to the cap 27 so as to encapsulate the resonator 23. The cap 27 is machined separately to make its recess 29 (FIG. 5G) using a wafer of the same crystalline material.

Figure 5H:
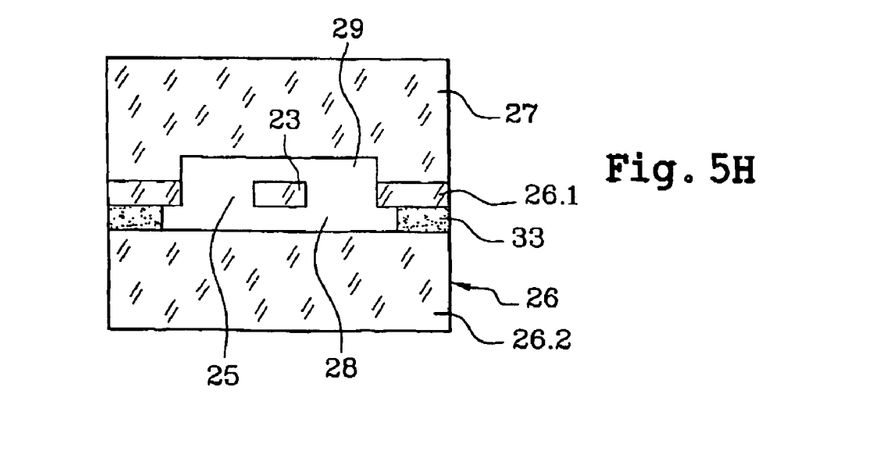

Assembly can be performed by one of the above-mentioned bonding techniques (FIG. 5H). The cavity 25 containing the resonator 23 can be evacuated.

In the example described and shown in FIG. 5C, the resonator 23 comprises a bridge element 23.1 having both ends connected to the frame 31, and a cantilever element 23.2 with one end connected to the frame 31 and its other end free. Such a structure with a cantilever element 23.2 makes it possible simultaneously to measure variations in pressure and variations in temperature, thereby enabling pressure to be measured with greater accuracy by applying compensation. The configuration of the FIG. 2C resonator does not enable dual measurements to be performed in this way.

FIGS. 4A to 4D show another variant of the pressure sensor 20 of the invention. It is shown in cross-section in FIG. 4A. The protective enclosure is not shown. The pressure sensor comprises a package 24 comprising a cap 27 and a baseplate 26. The baseplate 26 comprises a slab 34 and a frame 31 stacked one on the other and assembled together. The frame 31 is integral with a resonator 23. The frame 31 and the slab 34 are made out of the same material as the cap 27. The baseplate 26 and the cap 27 are made out of the same material as the resonator 23.

Figure 4A:
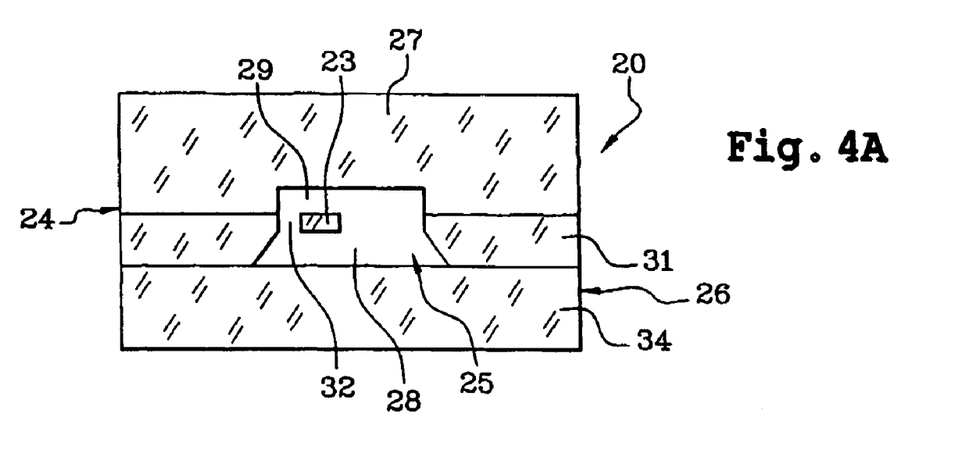
FIGS. 4A, 4B, 4C, and 4D are a cross-section through another embodiment of a pressure sensor of the invention and plan views of various portions of its package.
Figure 4B:
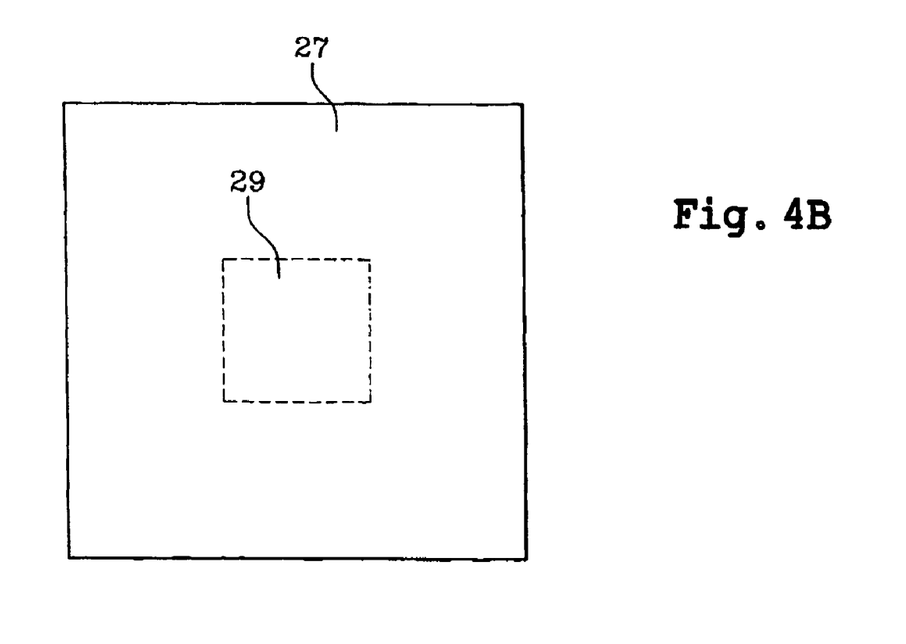
Figure 4C:
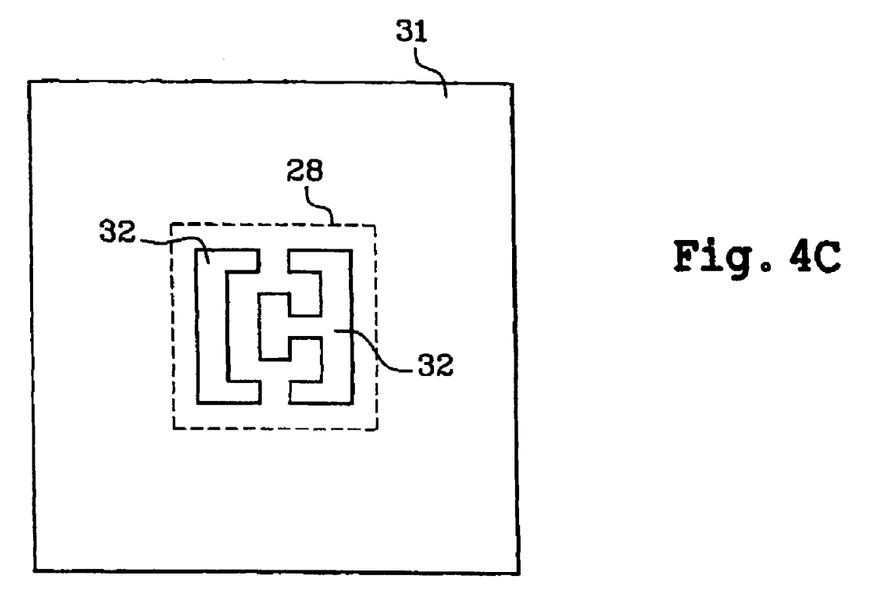
Figure 4D:
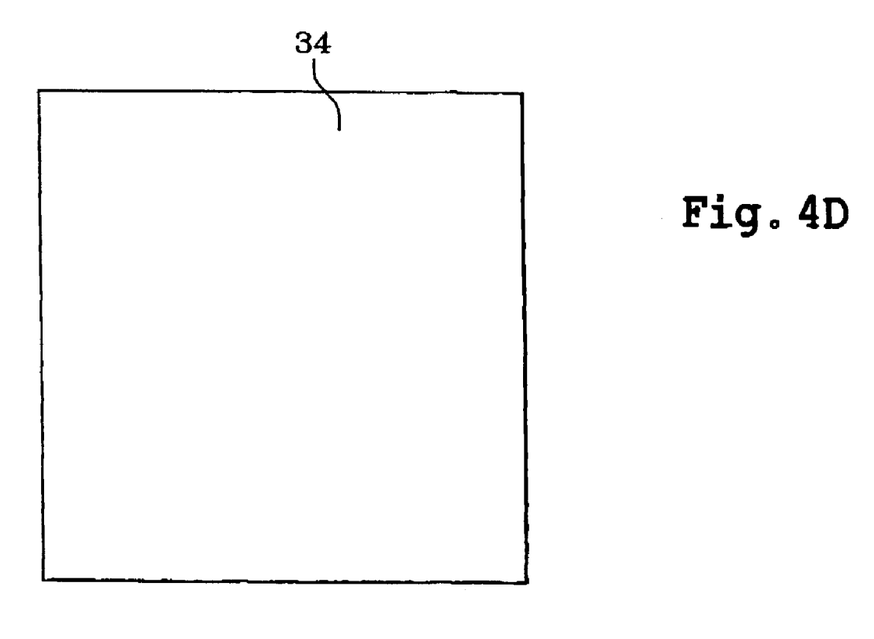

The cap 27 has a recess 29. In this variant, the slab 34 is made out of a first wafer of crystalline material, the frame 31 is made out of a second wafer of the same material and the cap 27 is made out of a third wafer of the same material. Openings 32 are etched in the second wafer to configure the resonator 23, and the resonator is thinned down by etching its surface that faces the slab 34 (FIG. 4C). The recess 29 is etched in the third wafer (FIG. 4B). The first wafer is not subjected to etching in order to make the slab 34, and it remains substantially plane (FIG. 4D).

The frame 31 is thicker than in the preceding example. The openings 32 in the frame 31 and the thinning of the resonator contribute to making the recess 28 of the baseplate 26. The frame 31 is even shown as being chamfered around the openings 32 in its face which meets the slab 34 so as to represent the effect of anisotropic chemical etching (FIG. 4A). This characteristic is optional.

Once the frame 31 has been associated with the resonator 23, they can together be assembled firstly to the slab 34 and secondly to the cap 27 by one of the bonding methods mentioned above.

In FIG. 4C, the resonator 23 is shown as comprising two facing tuning forks. Each fork has a handle and two branches. Each fork has one branch connected to a branch of the other. The other branch of each fork has an end that is free. The handles of the forks are secured to the frame 31. This structure likewise makes it possible to measure both variation in temperature and variation in pressure.

In FIGS. 2, 3, and 4, neither the excitation means, nor the frequency detection means are shown in order to avoid cluttering the figures, they are entirely conventional for a person skilled in the art.

A plurality of pressure sensors can be manufactured simultaneously and collectively by using wafers of suitable crystalline material, with the wafers being superposed and assembled together after the various etching and removal actions described above have been performed simultaneously. Thereafter, it suffices to separate the various pressure sensors obtained in this way.

In the examples described, various etching and withdrawal methods are specified. The invention is not limited to those methods. The etching for making the recesses or the openings, and the removal of the sacrificial oxide can be performed using other methods taken singularly or in combination, such as chemical etching, plasma etching, or mechanical etching, for example.

The resulting sensors are robust and simple and they can be manufactured with improved yield and lower cost than before. The shapes described above for the resonators are not limiting, and other shapes can be envisaged without going beyond the ambit of the invention. The same applies to the baseplate structures associated with the resonator shapes.

Figure 6:
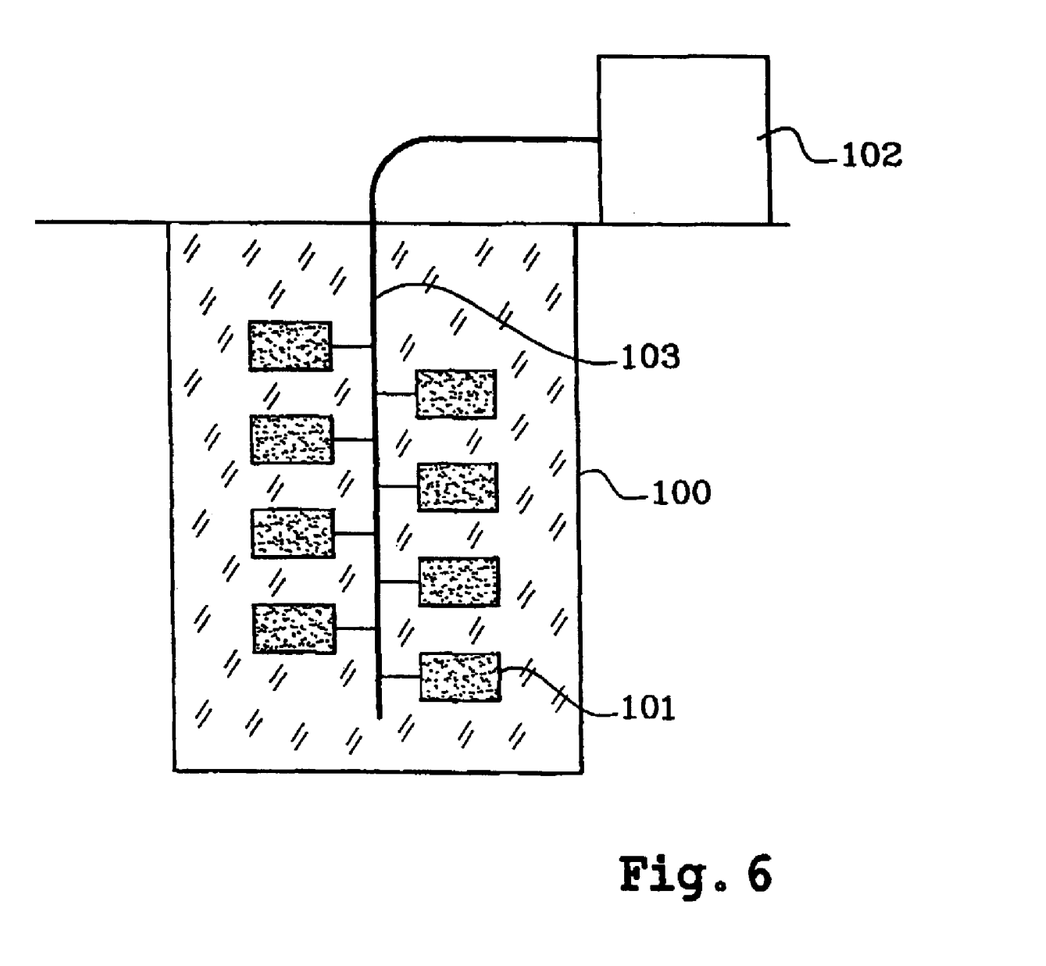
FIG. 6 shows pressure monitoring apparatus in accordance with the invention in a well.

The present invention also provides apparatus for monitoring pressure in a well, the apparatus comprising an array of pressure sensors distributed along at least a portion of the well and connected to apparatus on the surface equipment. The pressure sensors are of the kind described above. One such apparatus is shown in FIG. 10. The well, referenced 100, can be an oil well of any type, a deep well, a small diameter well, a lateral well, a multiple well, etc. The pressure sensors referenced 101 are connected in an array and they are placed in the well 100. The sensors are connected to common surface equipment 102 via at least one communication cable 103. The surface equipment 102 communicates with the sensors 101, controlling excitation thereof and picking up what they detect.

What is claimed is:

1. A microelectronic pressure sensor comprising a resonator made on the basis of a crystalline material secured to the inside of a package formed by a cap and a baseplate for assembling one to the other, each of the cap and the baseplate including a respective recess contributing to define a cavity between the cap and the baseplate in which the resonator is suspended, each of the cap and the baseplate being made completely or almost completely out of the same material as the resonator, and wherein the baseplate is rigid such that when the pressure to be detected is applied all around the package, stresses are distributed substantially uniformly around the package.

2. A pressure sensor according to claim 1, wherein the crystalline material is selected from monocrystalline silicon, polysilicon, and gallium arsenide.

3. A pressure sensor according to claim 1, wherein the dimensions of the cavity are small compared with the outside dimensions of the package.

4. A pressure sensor according to claim 1, wherein the baseplate comprises a slab and a frame superposed thereon, the resonator being secured to the frame, the frame lying between the cap and the slab when the package is closed.

5. A pressure sensor according to claim 4, wherein the slab is assembled to the frame, assembly taking place by bonding using a filler of metal or of glass, or by bonding without using any filler, in an oxidizing atmosphere.

6. A pressure sensor according to claim 5, wherein the frame contributes to defining the recess of the baseplate.

7. A pressure sensor according to claim 4, wherein the baseplate is a single piece.

8. A pressure sensor according to claim 7, the baseplate includes a residual sacrificial layer between the slab and the frame, said sacrificial layer contributing to defining the recess of the baseplate.

9. A pressure sensor according to claim 1, wherein the package is sealed by bonding using a filler of metal or of glass, or by bonding without using any filler, under an oxidizing atmosphere.

10. A pressure sensor according to claim 1, wherein the package is surrounded by a protective case with the pressure to be detected (Pe) being applied to the outside thereof, said case (21) being provided with pressure means enabling the pressure that is to be detected (Pe) lobe applied also to the inside of the case.

11. A pressure sensor according to claim 10, wherein the said pressure means are leakproof relative to the medium outside the case.

12. A pressure sensor according to claim 10, wherein said pressure means are permeable to the medium outside the case.

13. A pressure sensor according to claim 1, wherein the resonator comprises a cantilever element for performing a temperature measurement.

14. A pressure sensor according to claim 3, wherein the baseplate comprises a slab and a frame superposed thereon, the resonator being secured to the frame, the frame lying between the cap and the slab when the package is closed.

15. A pressure sensor according to claim 8, wherein the package is sealed by bonding using a filler of metal or of glass, or by bonding without using any filler, under an oxidizing atmosphere.

16. A pressure sensor according to claim 15, wherein the package is surrounded by a protective case with the pressure to be detected (Pe) being applied to the outside thereof, said case being provided with pressure means enabling the pressure that is to be detected (Pe) to be applied also to the inside of the case.

17. A pressure sensor according to claim 10, wherein the resonator comprises a cantilever element for performing a temperature measurement.

18. A pressure sensor according to claim 17, wherein said sensor withstands pressures of the order of $10^8$ Pa to $10^9$ Pa.

* * * * *